United States Patent [19]
McKinley et al.

[11] Patent Number: 5,668,222
[45] Date of Patent: Sep. 16, 1997

[54] THIXOTROPIC MOISTURE CURE URETHANE ADHESIVE

[75] Inventors: Andrew J. McKinley; Pankaj Shah, both of Crystal Lake, Ill.

[73] Assignee: Morton International, Inc., Chicago, Ill.

[21] Appl. No.: 650,761

[22] Filed: May 20, 1996

[51] Int. Cl.$^6$ .................. C08L 75/04; C08L 75/06; C08L 75/08

[52] U.S. Cl. .................. 525/415; 525/419; 525/423; 525/424; 525/440

[58] Field of Search .................. 525/415, 419, 525/440, 423, 424

[56] References Cited

U.S. PATENT DOCUMENTS 4,999,407  3/1991  Gilch et al. .................. 525/457
5,185,402  2/1993  Fleming et al. .................. 525/130

*Primary Examiner*—W. Robinson H. Clark
*Attorney, Agent, or Firm*—Wayne E. Nacker; Gerald K. White

[57] ABSTRACT

An adhesive composition which is a mixture of: (A) between about 30 and about 99 wt% of a first urethane adhesive component which is formed from a polyether polyol having a weight average molecular weight of between about 400 and about 10,000, the polyether polyol being end-capped with an isocyanate and having an isocyanate functionality between about 2.0 and about 3.0; (B) between about 1 and about 70 wt% of a second urethane adhesive component formed from a polyester diol or polyester diol mixture having hydroxyl functionalities of at least about 2, the polyester diol or polyester diol mixture being end-capped with an isocyanate and has a isocyanate functionality of between about 2 and about 2.3; and (C) between about 1 and about 70 wt% of unreacted isocyanate having an isocyanate functionality of between about 2 and about 3.

7 Claims, No Drawings

THIXOTROPIC MOISTURE CURE URETHANE ADHESIVE

The present invention is directed to moisture cure polyurethane adhesives, such as the type used as construction adhesives, and particularly to a thixotropic moisture cure polyurethane adhesive composition.

BACKGROUND OF THE INVENTION

Polyurethane construction adhesives offer an easy-to-use alternative to fasteners, such as nails or screws. One such polyurethane is based on polyalkylene diols end-capped with an isocyanate having isocyanate functionality greater than two. Such construction adhesives are typically applied by roll coater or bead applicator.

For other applications, thixotropy is a desirable characteristic, i.e., reduction in viscosity when subject to shear forces and a return to a more viscous state upon application. For example, thixotropy is desirable for an adhesive that is to be applied by caulk gun. Thixotropy is currently provided to such adhesives by the addition of waxes, fumed silica and other inorganic fillers. Such thixotropic agents may detract from the bond strengths of the construction adhesive. Also, such thixotropic agents are relatively expensive.

Another characteristic of such polyurethane adhesives is their tendency to foam, a characteristic which is disadvantageous in certain applications. For example, in producing a pre-fabricated stud framework, excessive foaming of the bondline will produce undesirable spacing between the framework pieces.

SUMMARY OF THE INVENTION

In accordance with the invention there is provided an adhesive composition which is a mixture of A) between about 30 and about 99 wt %, preferably between about 60 and about 92 wt %, of a first urethane adhesive component which is a formed from a polyether polyol formed from $C_2$–$C_4$-alkylene oxide units, said polyether polyol having a weight average molecular weight of between about 400 and about 10000, preferably between about 1000 and about 3000, said polyether polyol being a liquid at least down to about −40° C., said polyether polyol being end-capped with an isocyanate having an isocyanate functionality so as to provide said end-capped polyether polyol with isocyanate functionality beetween about 2.0 and about 3.0, B) between about 1 and about 70 wt % of a second urethane adhesive component formed from a polyester diol or polyester diol mixture, said polyester diol or polyester diol mixture comprising I) between about 40 and 100 wt % based on total weight of i)–iii) of a polyester formed of diols and dicarboxylic acids or anhydrides thereof, said polyester having a weight average molecular weight of between about 2000 and about 7000, and having a $T_g$ of between about −80° C. and about −20° C., ii) up to about 60 wt % based on total weight of i)–iii) of a polyester formed of diols and dicarboxylic acids or anhydrides thereof, said polyester having a weight average molecular weight of between about 4000 and about 60,000, preferably between about 4000 and about 10,000, and a $T_g$ of between about 10° C. and about 50° C., iii) up to about 40 wt % based on total weight of i)–iii) of a polycaprolactone having a weight average molecular weight of between about 1000 and about 3000, said polyester or said polyesters of said polyester mixture having hydroxyl functionalities of at least about 2 and being end-capped with an isocyanate of isocyanate functionality so as to provide said second adhesive component B) with an isocyanate functionality of between about 2 and about 2.3, and C) between about 1 and about 70 wt % of a third adhesive component which is unreacted isocyanate of isocyanate functionality of between about 2 and about 3, said first second and third components being provided in amounts proportioned to provide a thixotropic adhesive composition having a Brookfield Viscometer viscosity of between about 150,000 and about 2,000,000 at 20° C., but which has a flowable viscosity under a minimum shear force of 10–30 psi ($7.0 \times 10^3$ –$2.1 \times 10^4$ kg/m²).

DETAILED DESCRIPTION OF THE PREFERRED EMBODIMENTS

The first polyurethane adhesive component A) is of the type typically used as a construction adhesive. A polyether chain is formed in a conventional manner from $C_2$–$C_4$-alkylene oxides, preferably ethylene and/or propylene oxides and most preferably as a homopolymer of propylene oxide units. Propylene oxide units in polyether chains promote strong adhesion. Ethylene oxide units in polyether chains promote absorption of moisture, and therefore, more rapid moisture-cure. While the polyether chain is generally linear, it may be branched through the inclusion of monomers, such as trimethylol propane, having OH functionality greater than 2.

Herein, functionalities are used in a conventional sense to mean average functionalities of the individual molecules. To provide isocyanate functionality of the polyols, the isocyanates used herein must have a functionality of at least 2. In end-capping a polyol (either polyether or a polyester), the functionality of the end-capped polyol is the OH functionality of the polyol plus the isocyanate functionality of the isocyanate minus 2 (an OH and an isocyanate functionality each being depleted in the end-capping reaction). Thus, for example, a polyol having an OH functionality of 2 end-capped with an isocyanate having a functionality of 2.3 would have an isocyanate functionality of 2.3, or a polyether having an OH functionality of 3 which is end-capped with an isocyanate having a functionality of 2 would have an isocyanate functionality of 3.

The polyether polyol is reacted with an excess of an isocyanate having a functionality of 2 or greater, i.e., from about 2.0 to about 3.0, thereby end-capping the polyether chains and leaving unreacted isocyanate, which unreacted isocyanate forms part of third adhesive component C). The NCO/OH ratio of the end-capping reaction mixture is between about 1.5 and about 10. Suitable isocyanates for reaction with the polyether include, but are not limited to polymeric methylene bis-phenyl diisocyanate, monomeric methylene bis-phenyl diisocyanate, tolylene diisocyanate, and mixtures thereof. A currently preferred isocyanate is polymeric methylene bis-phenyl diisocyanate (polymeric MDI) having an isocyanate functionality of about 2.3. Polymeric MDI is produced as a by-product in the production of methylene bis-phenyl diisocyanate (MDI).

Such polyurethanes, i.e., end-capped polyether plus unreacted isocyanate, in uncured form, tend to act as nearly Newtonian fluids or solids. Heretofore, thixotropy has been only achieved with the addition of the aforementioned waxes or inorganic fillers.

The second polyurethane adhesive component B) is the major component of a typical hot-melt adhesive (i.e., end-capped polyester plus unreacted isocyanate). Such a hot-melt adhesive is solid at room temperature, i.e., at 20° C., but melts at moderately elevated temperatures, e.g., 82°–121° C., whereby the hot-melt adhesive can be applied in a molten state and then cooled to provide initial bond strength. So long as moisture is excluded, a hot-melt adhesive may be repeatedly melted and solidified.

The polyester polyols used to form the second adhesive component B) are synthesized by conventional methods from polyols (chiefly diols or alkylene oxides) and polycarboxylic acids (chiefly dicarboxylic acids or their anhydrides). Suitable diols and alkylene oxides include, but are not limited to 1,4-butane diol, 1,3-butane diol, ethylene glycol, neopentyl glycol, 1,5-pentane diol, 1,6-hexanediol, hexylene glycol, diethylene glycol, propylene glycol, dipropylene glycol, triethylene glycol, and mixtures thereof. Suitable dicarboxylic acids include isophthalic acid, terephthalic acid, orthophthalic acid, succinic acid, adipic acid, azelaic acid, sebacic acid, anhydrides thereof, and mixtures of such acids and anhydrides. While the polyester chains are generally linear, some branching may be introduced, e.g., by polyols, such as trimethylol propane, or polycarboxylic acids, e.g. trimellitic anhydride, having hydroxy and/or carboxylic acid functionality grater than 2.

The second polyurethane adhesive component B) must have a significant degree of crystallinity so as to provide the hot-melt adhesive properties. The degree of crystallinity is determined by the regularity of the polymer chain, as this determines the degree to which chains can stack. Thus, a polyester chain formed from a single diol species and a single dicarboxylic acid species will tend to have a greater degree of crystallinity and a lower $T_g$ than a polyester chain formed from mixed polyols and polycarboxylic acids.

A currently preferred polyester i), which may be used alone or in conjunction with up to about 60 wt % other polyesters, is a copolymer of hexane diol and adipic acid, in particular such a copolymer having a weight average molecular weight of between about 3200 and about 3600 and having a $T_g$ of −60° C.

Polyester ii) having a significantly higher $T_g$ than polyester i) is optionally included to enhance green strength. A currently preferred polyester ii) is a polymer formed of isophthalic acid, terephthalic acid, neopentyl glycol, 1,6-hexanediol, and ethylene glycol and has a weight average molecular weight of about 4600–6200. If used, polyester ii) is typically used at a level of at least about 5 wt % of the polyester mixture.

The polycaprolactone iii) in a polyester mixture is optionally used at up to 40 wt % of the polyester i)–iii) mixture for adjustment of viscosity of the hot-melt adhesive component and to slow crystallization, as desired. If used, the polycaprolactone iii) is typically used at at least about 5 wt % of the polyester mixture.

Polyester i) and optional polyesters ii) and iii) each have terminal functionalities which are predominantly OH groups, thereby giving them OH functionalities of at least about 2. In the case of iii), polycaprolactone, the polycaprolactone is polymerized with a diol to provide OH termini, and thereby an OH functionalitiy of about 2. However, each of the polyesters may have some carboxylic acid functionality, i.e., up to about an acid number of about 2.00. In fact, adhesion to some substrates may be improved if the polyester has some acid functionality.

The polyester polyol or polyester polyol mixture is end-capped with an excess of an isocyanate or mixture of isocyanates having isocyanate functionality of 2 to about 2.3. The NCO/OH ratio of the end-capping reaction mixture is between about 1.5 and about 3.5. A currently preferred end-capping isocyanate is monomeric methylene bis-phenyl diisocyanate(MDI). However, other isocyanates include, but are not limited to tolylene diisocyanate, m-phenylene diisocyanate, hexamethylene diisocyanate, isophorone diisocyanate and mixtures thereof. Unreacted isocyanate used in producing the second adhesive component B) provides a portion of the unreacted isocyanate component C). (Generally, a significantly greater excess of isocyanate is used in forming the first adhesive component A) than is used in forming the second adhesive component B)).

It is most surprising that the hot-melt adhesive component B) provides thixotropic properties to the cross-linking construction adhesive component A), each of components A) and B) alone acting substantially in Newtonian fashion. The polyether and polyester chains of adhesive components A) and B) tend to be incompatible. End-capped adhesive components A) and B), however, are somewhat compatible. At melt temperatures, the components are homogeneous, but at ambient temperatures, the compositions of the present invention are cloudy, indicating some phase separation. While applicants are not bound by theory, this phase separation may provide the thixotropy achieved by the compositions of the present invention with the second adhesive component B) providing a structure for components A) and C).

Thixotropic properties may be exhibited at levels of the second urethane adhesive component B) as low as about 1 wt %, although more profound effects are exhibited beginning at about 5 and particularly 10 wt %. If the adhesive is to be applied at room temperature, i.e., 20°–25° C., the upper limit of the second adhesive is about 40 wt %, preferably about 20 to 30 wt %. On the other hand, if the adhesive is to be applied hot, the second adhesive may be present at up to 70 wt %, preferably no more than 60 wt %. Unlike waxes or inorganic fillers heretofore used as thixotropic agents in construction adhesives, the second (hot-melt) adhesive component B) strengthens the bond that is formed. That is, the second adhesive component participates in the cure of the adhesive composition to strengthen, stiffen and reinforce the polymer matrix that develops upon moisture cure.

Furthermore, the second adhesive component B) substantially reduces foaming of the adhesive composition as it cures. Thus, this adhesive composition is particularly useful for applications where it is undesirable that the adhesive force apart the bonded parts. For example, the adhesive composition is particularly useful in forming pre-fabricated stud frameworks for the construction industry. The fact that the adhesive composition foams less, further contributes to bond strength.

To form a bond using the adhesive composition of the present invention, the work pieces with a bead of adhesive need to be only contacted together, substantially zero pressure being required to form the bond. This is in contrast with typical construction adhesives which typically require at least 3 psi to counter-act the $CO_2$ generation from the isocyanate-water reaction.

The compositions are cured by moisture. Moisture in the atmosphere is generally sufficient, although curing may be accelerated by adding moisture, e.g., spraying surfaces of components to be bonded with moisture.

The adhesive composition of the present invention may be prepared by separately preparing the first adhesive component and the second adhesive component and then mixing them together.

Some economies are achieved by producing the adhesive composition in situ as a one-pot preparation. In such case, the second (hot-melt) adhesive composition is prepared first by end-capping the polyester polyol or polyester polyol mixture with the isocyanate and then adding the polyether polyol and end-capping the polyether polyol with additional isocyanate. On the other hand, in a one-pot preparation, the reverse order of preparation, i.e., end-capping the polyether polyol followed by end-capping the polyester polyol (or polyester polyol mixture) tends not to work well. This is because heating the polyether polyol A) plus excess isocyanate (part of C)) to greater than 80° C. for extended periods of time, particularly when polymeric isocyanate is used for end-capping the polyether, has been known to cause undesirable side reactions such as dimerization, trimerization, biuret formation, etc.

To promote more rapid cure, a catalyst, such as dibutyl tin dilaurate (DBTDL), or a modified tertiary amine catalyst, such as dimorpholine diethyl ether (DMDEE) may be added to hasten cure of the adhesive composition. If used, catalyst is typically added at between about 0.005 and about 0.30 phr (parts per hundred resin by weight based on the weights of adhesive components A), B), and C)).

The adhesive composition of the present invention may also contain minor amounts of additives conventional in the art, such as stabilizers and moisture scavengers, e.g. benzoyl chloride or p-toluenesulfonyl isocyanate (PTSI).

The invention will now be described in greater detail by way of specific examples.

EXAMPLE 1

A hot-melt adhesive was prepared from the following components:

| Component | Weight % |
|---|---|
| a) Polyester, $M_w$ 3100, hexanediol adipate | 57.0 |
| b) Polyester, $M_w$ 9950* | 9.8 |
| c) Polycaprolactone, $M_w$ 2000 | 17.9 |
| MDI | 15.3 |
| Benzoyl chloride | 0.02 |

* a polyester prepared from isophthalic acid, 40 mole%, terephthalic acid 20 mole%, neopentyl glycol 12 mole%, 1,6-hexanediol 16 mole% and ethylene glycol 12 mole%.

The hot-melt adhesive was prepared by purging a dry, clean vessel with dry nitrogen. Melted polyester a) (at 66° C.), and melted polycaprolactone c) (66° C.) were introduced; then polyester b) was added as a solid. The temperature was raised to 125° C. under a nitrogen blanket. Agitation was begun, and a 613–735 mm Hg vacuum was pulled for 45 minutes. The vacuum was released, introducing nitrogen. The MDI was added and the temperature held for one hour. Benzoyl chloride was added with mixing for 5 minutes, thereby producing a hot-melt adhesive.

The hot melt adhesive was mixed at a 20/80 weight ratio with a conventional construction adhesive sold as Mor-Ad M-642® by Morton International at 125° C. for 30 minutes. Heat was removed and the mixed adhesive composition was subjected to vacuum of 613–735 mm Hg for 15 minutes, after which the vacuum was released by introduction of nitrogen. A catalyst, dimorpholine diethylether (DMDEE), was added at 0.6 wt % relative to the total mixture. (The amount of catalyst added can vary, depending upon the desired cure time). The mixture was then dispensed to cans and capped with nitrogen. (Mor-Ad M-642 is prepared by end-capping poly(propylene glycol) with polymeric MDI, unreacted MDI comprising 10.887 wt % of the Mor-Ad M-642®.)

EXAMPLE 2

A two-urethane adhesive component adhesive composition was prepared in situ using the following components:

| Component | Weight % |
|---|---|
| Polyester a) (as Example 1) | 14.238 |
| Polyester b) (as Example 1) | 2.449 |
| Polycaprolactone c) (as Example 1) | 4.482 |
| MDI | 3.824 |
| Benzoyl chloride | 0.007 |
| Rubinate ® 1820, polymeric MDI, functionality 2.3 | 31.373 |
| Pluracol ® P-2010, polypropylene glycol $M_w$ 2000 | 43.549 |
| Benzoyl Chloride | 0.025 |
| DBTDL | 0.053 |

Of the components above, the first 5 were used to form the second (hot-melt) adhesive component, and the later four the first adhesive component.

The one-pot adhesive composition was prepared by first preparing a hot-melt adhesive as per Example 1. The polymeric MDI was added, thereby cooling the mixture; then the propylene glycol diol was added, further cooling the mixture. Half of the benzoyl chloride (8th listed component) was added. The mixture was heated to 80° C. and held thereat for three hours. The second half of the benzoyl chloride was added and then the DBTDL was added and mixed for 10 minutes. A 613–735 mm Hg vacuum was pulled for 15 minutes and the mixture was heated to 100° C. Heat was removed and the vacuum was released to nitrogen the Adhesive composition was dispensed to cans and capped under nitrogen.

What is claimed is:

1. An adhesive composition comprising
   A) between about 30 and about 99 wt % of a first urethane adhesive component which is a formed from a polyether polyol formed from $C_2$–$C_4$-alkylene oxide units, said polyether polyol having a weight average molecular weight of between about 400 and about 10000, said polyether polyol being a liquid at least down to about −40° C., said polyether polyol being end-capped with an isocyanate having an isocyanate functionality so as to provide said end-capped polyether polyol with isocyanate functionality beetween about 2.0 and about 3.0,
   B) between about 1 and about 70 wt % of a second urethane adhesive component formed from a polyester diol or polyester diol mixture, said polyester diol or polyester diol mixture comprising
      i) between about 40 and 100 wt % based on total weight of i)–iii) of a polyester formed of diols and dicarboxylic acids or anhydrides thereof, said polyester having a weight average molecular weight of between about 2000 and about 7000, and having a $T_g$ of between about −80° C. and about −20° C.,
      ii) up to about 60 wt % based on total weight of i)–iii) of a polyester formed of diols and dicarboxylic acids or anhydrides thereof, said polyester having a weight average molecular weight of between about 4000 and about 60,000, and a $T_g$ of between about 10° C. and about 50° C.,
      iii) up to about 40 wt % based on total weight of i)–iii) of a polycaprolactone having a weight average molecular weight of between about 1000 and about 3000,
   said polyester or said polyesters of said polyester mixture having hydroxyl functionalities of at least about 2 and being end-capped with an isocyanate of isocyanate functionality so as to provide said second adhesive component B) with an isocyanate functionality of between about 2 and about 2.3, and C) between about 1 and about 70 wt % of a third adhesive component which is unreacted isocyanate of isocyanate functionality of between about 2 and about 3, said first, second, and third components being provided in amounts proportioned to provide a thixotropic adhesive composition having a Brookfield Viscometer viscosity of between about 150,000 and about 2,000,000 at 20° C., but which has a flowable viscosity under a minimum shear force of 10–30 psi ($7.0 \times 10^3$–$2.1 \times 10^4$ kg/m$^2$).

2. An adhesive composition according to claim 1 wherein said polyester ii) comprises at least about 5 wt % of said polyester mixture.

3. An adhesive composition according to claim 1 wherein said polycaprolactone iii) comprises at least about 5 wt % of said polyester mixture.

4. An adhesive composition according to claim 1 wherein said polyether polyol has a weight average molecular weight between about 1000 and about 3000.

5. An adhesive composition according to claim 2 wherein said polyester ii) has a weight average between about 4000 and about 10,000.

6. An adhesive composition according to claim 1 wherein said second adhesive component comprises at least about 5 wt % of said adhesive composition.

7. An adhesive composition according to claim 1 wherein said second adhesive component comprises at least about 10 wt % of said adhesive composition.

* * * * *